(12) United States Patent
Lin et al.

(10) Patent No.: US 7,880,447 B1
(45) Date of Patent: Feb. 1, 2011

(54) POWER CONVERTER CONTROLLER IC HAVING INPUT VOLTAGE PIN WITH MULTIPLE FUNCTIONS

(75) Inventors: Allan Ming-Lun Lin, Pleasanton, CA (US); Junjie Zheng, Santa Clara, CA (US); Jiang Chen, Santa Clara, CA (US)

(73) Assignee: iWatt Inc., Los Gatos, CA (US)

( * ) Notice: Subject to any disclaimer, the term of this patent is extended or adjusted under 35 U.S.C. 154(b) by 1119 days.

(21) Appl. No.: 11/558,143

(22) Filed: Nov. 9, 2006

Related U.S. Application Data (60) Provisional application No. 60/735,522, filed on Nov. 10, 2005.

(51) Int. Cl.
*H02J 7/00* (2006.01)

(52) U.S. Cl. .................... 320/166; 363/21.13; 323/283

(58) Field of Classification Search .................. 320/166, 320/167; 363/21.13; 323/283
See application file for complete search history.

(56) References Cited

U.S. PATENT DOCUMENTS

| | | | |
|---|---|---|---|
| 5,610,503 A * | 3/1997 | Fogg et al. .................. 323/283 |
| 6,061,257 A | 5/2000 | Spampinato et al. |
| 6,166,927 A | 12/2000 | Farrington et al. |
| 6,169,680 B1 | 1/2001 | Matsui et al. |
| 6,532,161 B2 | 3/2003 | Kovalevskii et al. |
| 6,545,882 B2 | 4/2003 | Yang |
| 6,760,203 B2 | 7/2004 | Usui |
| 6,882,552 B2 | 4/2005 | Telefus et al. |
| 6,944,034 B1 | 9/2005 | Shteynberg et al. |
| 6,958,920 B2 | 10/2005 | Mednik et al. |
| 7,009,369 B2 * | 3/2006 | Ni et al. ...................... 323/267 |
| 7,030,512 B2 | 4/2006 | Krein |
| 7,061,780 B2 | 6/2006 | Yang et al. |
| 7,136,292 B1 * | 11/2006 | Chan et al. ................ 363/21.09 |
| 7,170,763 B2 | 1/2007 | Pai et al. |
| 7,239,117 B2 | 7/2007 | Lee et al. |
| 7,250,745 B2 | 7/2007 | Yasukouchi et al. |
| 7,362,593 B2 | 4/2008 | Yang et al. |
| 7,411,378 B2 | 8/2008 | Lathrop et al. |
| 7,443,700 B2 | 10/2008 | Yan et al. |
| 2002/0057080 A1 | 5/2002 | Telefus et al. |
| 2006/0043954 A1 | 3/2006 | Markowski |
| 2007/0206338 A1 * | 9/2007 | Ishino ........................ 361/93.9 |
| 2008/0067994 A1 | 3/2008 | Kesterson et al. |

* cited by examiner

*Primary Examiner*—Edward Tso
*Assistant Examiner*—Ramy Ramadan
(74) *Attorney, Agent, or Firm*—Fenwick & West LLP (57) ABSTRACT

A controller integrated circuit (IC) for controlling a power converter uses its input voltage pin with a plurality of functions, including receiving an input voltage to the power converter, charging an external startup capacitor through charging circuitry coupled internally to the input voltage pin, and also receiving a test signal for programming a programmable resistance in an input voltage scale down circuitry coupled to the input voltage pin. Use of the input voltage pin with a plurality of functions reduces the number of pins required in the controller IC, thereby reducing the cost of manufacturing the controller IC.

26 Claims, 5 Drawing Sheets

POWER CONVERTER CONTROLLER IC HAVING INPUT VOLTAGE PIN WITH MULTIPLE FUNCTIONS

CROSS-REFERENCE TO RELATED APPLICATION

This application claims priority under 35 U.S.C. §119(e) to co-pending U.S. Provisional Patent Application No. 60/735,522 entitled "Digital Off-line Low Power Supply Controller," filed on Nov. 10, 2005, which is incorporated by reference herein in its entirety,

BACKGROUND OF THE INVENTION

1. Field of the Invention

The present invention relates to a power converter and, more specifically, to a power converter controller IC (integrated circuit) that has an input voltage pin with multiple functions.

2. Description of the Related Art

With the explosive growth of the number of electronic devices recently, the demand for power converters used as adapters or changes for these electronic devices is also growing at a rapid rate. These power converters are typically controlled by power converter controller ICs. Especially, switching mode power converters are typically controlled by power converter controller ICs that control the on-times ($T_{ON}$) or off-times ($T_{OFF}$) of the switch in the power converters to regulate the output voltage and power of the power converters.

The power converter industry is under significant pressure to manufacture power converter controller ICs that are highly efficient but can also be manufactured at low cost. Because the manufacturing cost of ICs is highly dependent upon the die size, the number of pins, the packaging, and testing of the IC, it is desirable to reduce the number of pins of an IC. However, it is difficult to reduce the number of pins in conventional power converter controller ICs, because in conventional power converter controller ICs each pin of the IC is associated with a single, separate parameter or function and thus the IC required as many pins as the number of parameters or functions either input to or output from the controller IC. Thus, it is difficult to reduce the number of pins in the power converter controller IC without reducing the number of parameters either input to or output from the controller IC and thereby sacrificing the performance of the power converter.

Therefore, there is a need for a technique to reduce the number of pins used in a power converter controller IC and reduce manufacturing costs of the IC without reducing the number of parameters or sacrificing the performance of the power converter.

SUMMARY OF THE INVENTION

Embodiments of the present invention include a power converter controller IC that uses the input voltage pin with a plurality of functions, including receiving an input voltage to the power converter, charging an external startup capacitor through charging circuitry coupled internally to the input voltage pin, and also for receiving a test signal used for programming a programmable resistor in input voltage scale down circuitry coupled to the input voltage pin. Use of the input voltage pin with a plurality of functions reduces the number of pins required in the controller IC, thereby reducing the cost of manufacturing the controller IC.

In one embodiment, the controller IC comprises charging circuitry coupled internally to the input voltage pin of the controller IC for charging a capacitor coupled externally to a supply voltage pin of the controller IC. The charging circuitry comprises a switch that is turned on and off in response to a power-on-reset (POR) signal, where the POR signal is in a first state to turn on the switch when the input voltage to the power converter is below a first threshold voltage and in a second state to turn off the switch when the input voltage to the power converter rises above the first threshold voltage but does not fall below a second threshold voltage. When the input voltage falls below the second threshold voltage, the POR signal transitions to the first state again to turn on the switch. The capacitor is charged while the switch is turned on, and the capacitor provides supply voltage to the controller IC during a startup mode of the power converter.

In another embodiment, the controller IC comprises scale down circuitry for scaling down the input voltage received at the input voltage pin to a voltage level compatible with the device characteristics of the controller IC. The scale down circuitry comprises a first transistor coupled to receive the input voltage, a second transistor connected in series to the first transistor, and a programmable resistor connected in series to the second transistor. The input voltage to the power converter is scaled down by the programmable resistor when both the first and second transistors are turned on. The second transistor is always on, while the first transistor is turned on and off in response to a power-on-reset (POR) signal. The POR signal is in a first state when the input voltage to the power converter rises above a first threshold voltage to turn on the first transistor and in a second state when the input voltage to the power converter falls below a second threshold voltage to turn off the first transistor.

The programmable resistor comprises a plurality of resistors connected in series and a plurality of switches each coupled to one of the resistors, where each of the switches is configured to short one of the resistors to which each of the switches is coupled when the switch is closed. The programmable resistor is programmed by a clock count signal determining how many of the switches are closed and how many of the resistors of the programmable switches are shorted by said closed switches. A test signal is input to the input voltage pin, where the test signal includes a first positive pulse indicating the start of a test mode, a plurality of negative pulses following the first positive pulse, and a second positive pulse indicating the end of the test mode. The count of the number of negative pulses is used to set the programmable resistor, in such a way that the count of the number of negative pulses in the test signal is inversely proportional to the set resistance of the programmable resistor.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
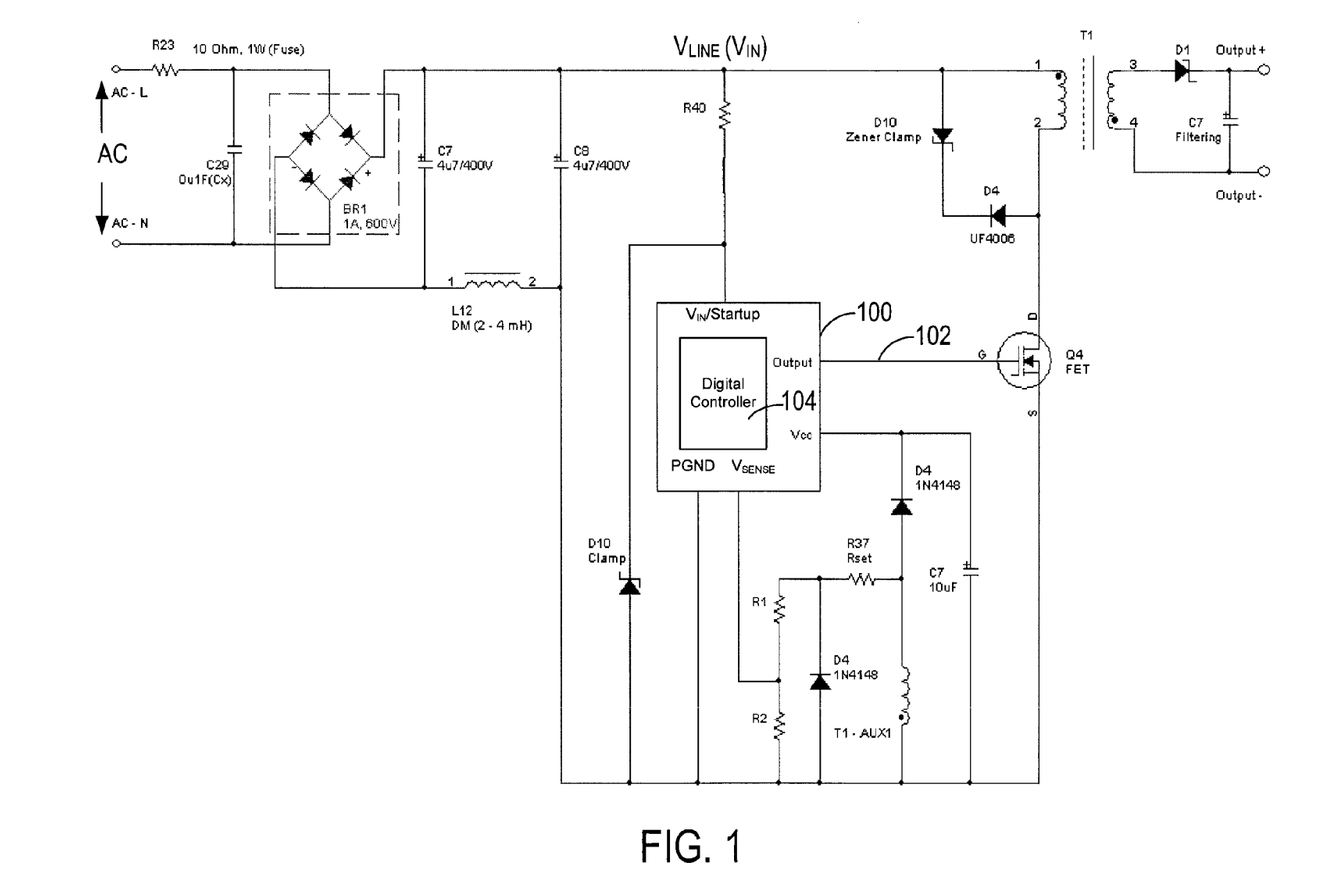
FIG. 1 illustrates an AC-DC flyback power converter with primary-side sensing, according to one embodiment of the present invention.

FIG. 1 illustrates AC-DC flyback power converter with primary-side sensing, according to one embodiment of the present invention. Although the power converter of FIG. 1 is an AC-DC flyback converter with primary side sensing of the feedback signals, it should be noted that the present invention is not limited to a flyback converter and that it can be applied to any type of power converter of any topology and any type of feedback sensing. The power converter includes, among other components, a bridge rectifier BR1, a transformer T1, a switch Q4, an output rectifier diode D1, output filter capacitor C7, and a power converter controller 100. The controller 100 includes a digital controller 104 together with a number of other components (not shown herein).

Referring to FIG. 1, the rectifier BR1 receives an input AC voltage and converts it into a full-wave rectified voltage for transfer to the output OUTPUT. The power converter controller 100 controls the opening and closing of the switch Q4 using its output control signal 102 generated by the digital controller 104 in the form of pulses with on-times ($T_{ON}$) and off-times ($T_{OFF}$). The output control signal 102 may be a periodic pulse with a fixed period, or a pulse with its period varying as necessary. When the switch Q4 is turned on because the pulse 102 is high during the on-time, energy is stored in the primary side windings of the transformer T1 because the diode D1 is reverse biased. When the switch Q4 is turned off, the energy stored in the primary windings of the transformer T1 is released to the secondary side of the transformer T1 because the diode D1 becomes forward biased. The diode D1 rectifies the output voltage on the secondary windings of the transformer T1 and the capacitor C7 filters the output voltage signal on the secondary windings of the transformer T1 for outputting as the output voltage OUTPUT. By controlling the period of time during which the switch Q4 is on or off, i.e., the on-times ($T_{ON}$) and off-times ($T_{OFF}$), the power converter can control the amount of power delivered to the output. Note that explanation on other components of FIG. 1 is sometimes omitted herein merely because they are not particularly relevant to explaining the claimed inventions herein.

As shown in FIG. 1, the power converter controller IC 100 has only 5 pins, $V_{IN}$/Startup, a ground pin (PGND), a $V_{SENSE}$ pin, a chip supply voltage pin Vcc, and an Output pin. The power converter controller 100 receives an input voltage ($V_{IN}$ also referred to herein as $V_{LINE}$) which is scaled down from the output voltage of the rectifier BR1, via the $V_{IN}$/Startup pin. In addition, the $V_{IN}$/Startup pin is associated with additional functions in addition to receiving the input voltage as explained below with reference to FIGS. 2 and 4. The power converter controller 100 receives a divided-down version ($V_{SENSE}$) of the reflected secondary voltage on the auxiliary windings T1-AUX1 of the transformer T1 through the $V_{SENSE}$ pin, receives the supply voltage (Vcc) via the Vcc pin, and is connected to ground via the PGND pin. Finally, the power converter controller 100 generates and outputs the pulse 102 for controlling the switch Q4 via the OUTPUT pin.

Figure 2:
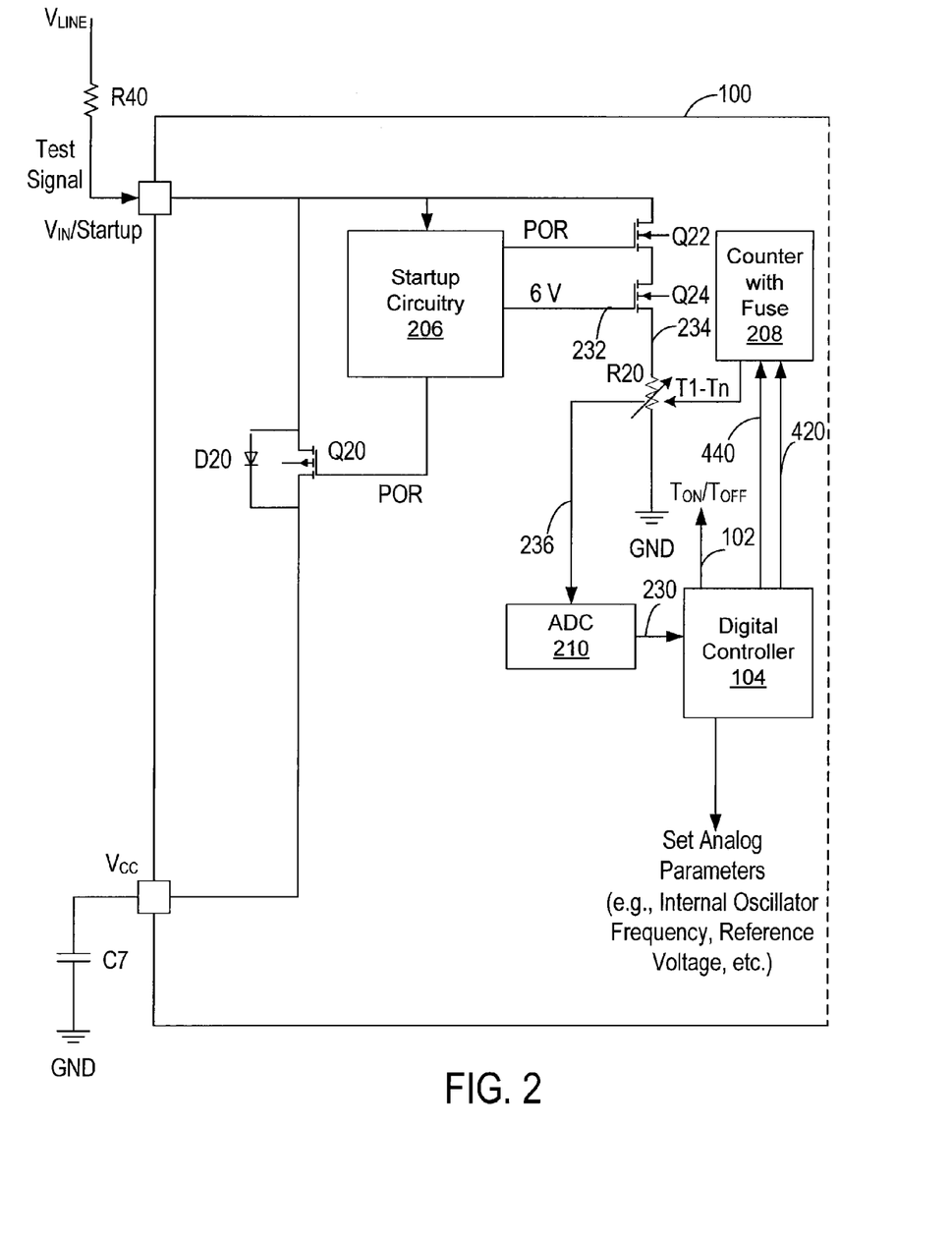
FIG. 2 illustrates the circuitry connected to the $V_{IN}$ pin of the power converter controller in the AC-DC flyback power converter of FIG. 1, according to one embodiment of the present invention.

FIG. 2 illustrates the circuitry connected to the $V_{IN}$ pin of the power converter controller in the AC-DC flyback power converter of FIG. 1, according to one embodiment of the present invention. FIG. 2 shows only part of the power converter controller 100 circuitry coupled to the $V_{IN}$/Startup pin and the Vcc pin, and other parts of the power converter controller 100 that are not specifically relevant for explaining the present invention are omitted in FIG. 2 as denoted by the dotted line on the right edge of the power converter controller IC 100 in FIG. 2. The power converter controller 100 includes Vcc charging circuitry and $V_{IN}$ scale down circuitry, both of which are connected to the $V_{IN}$/Startup pin.

Referring to FIGS. 1 and 2, the Vcc charging circuitry is comprised of the p-type MOSFET (Metal Oxide Semiconductor Field Effect Transistor) switch Q20 (including its parasitic diode D20). When the switch Q20 is turned on, the Vcc charging circuitry serves as a bleeding charge current path internal to the controller IC 100, from the input line voltage $V_{IN}$ via the $V_{IN}$/Startup pin to the capacitor C7, to charge the capacitor C7. The capacitor C7 is connected to the Vcc pin externally to the controller IC 100, in order to provide the supply voltage Vcc to the power converter controller 100. For example, if 15 μA is provided through the $V_{IN}$/Startup pin, part (e.g., 7 μA) of that current may be drawn by the startup circuitry 206 that includes circuitry to power up and start the chip 100, and the remaining part (e.g., 8 μA) of that current may be used to charge the Vcc capacitor C7. The Vcc supply voltage (Vcc) across the capacitor C7 is used to start the power converter controller IC 100 before the power converter operates in normal operation mode and electrical energy for running the power converter controller IC 100 is received through the auxiliary winding T1-AUX1 of the transformer T1.

Note that the Vcc charging circuitry is implemented on-chip on the power converter controller IC 100, and there is no circuitry external to the power converter controller 100 that connects the input line voltage $V_{IN}$ to the capacitor C7. In essence, the $V_{IN}$/Startup pin is used as a charging path internal to the controller IC 100 for charging the supply voltage (Vcc) capacitor C7 connected externally to the controller IC through the power converter controller IC 100. Therefore, the entire power converter circuitry may be implemented in a simple configuration with fewer external parts.

Figure 3:
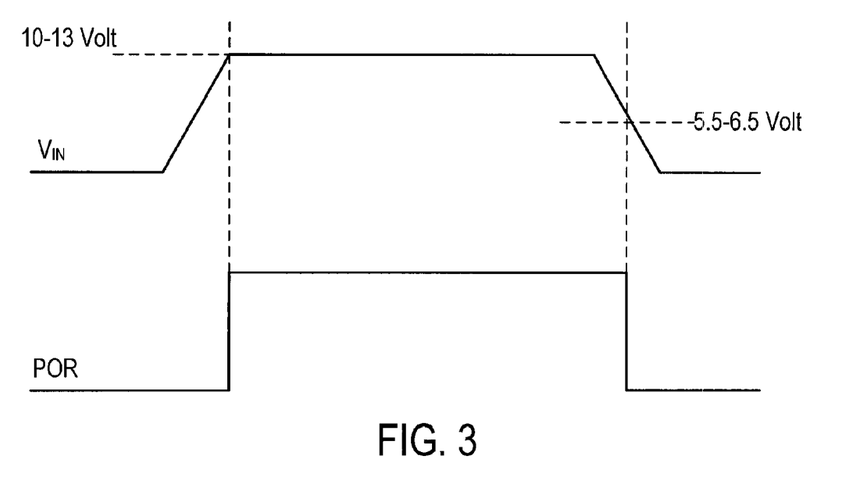
FIG. 3 illustrates the POR (Power On Reset) signal used in the circuitry of FIG. 2, according to one embodiment of the present invention.

The switch Q20 may be turned on and off according to a POR (Power On Reset) signal that is generally high while the input line voltage $V_{IN}$ is high. FIG. 3 illustrates the POR (Power On Reset) signal used in the circuitry of FIG. 2, according to one embodiment of the present invention. In one embodiment, the POR signal is generated by the startup circuitry 206. As shown in FIG. 3, POR becomes high when the input line voltage $V_{IN}$ rises above a predetermined voltage (e.g., 10-13 Volt) and becomes low when the input line voltage $V_{IN}$ falls below another predetermined voltage (e.g., 5.5-6.5 Volt). The switch Q20 is on while the POR signal is low to charge the capacitor C7 and the switch Q20 is off while the POR signal is high to shut off the charging path to the capacitor C7.

In one embodiment, the power converter controller IC 100 is fabricated on silicon using a low voltage CMOS (Complementary Metal-Oxide Semiconductor) process, which typically cannot withstand a voltage higher than 3.6 V in the devices. This is at odds with a power converter controller that typically should be able to receive and withstand 260 V of input line voltage $V_{IN}$. This is why the $V_{IN}$ scale down circuitry is needed.

Referring back to FIG. 2, the $V_{IN}$ scale down circuitry is comprised of the two n-type MOSFETs Q22, Q24 and a programmable resistor R20. As shown in FIG. 2, the transistor Q22 is turned on and off according to the POR signal, and the transistor Q24 is always turned on by applying a high voltage (e.g., 6 V) to its gate.

When the controller IC 100 is turned on, POR becomes high and the transistor Q22 is turned on. The transistor Q24 is always turned on. The transistor Q24 has resistor-like characteristics in its MOSFET linear region, providing a certain voltage drop. Thus, the input line voltage $V_{IN}$ (also referred to herein as $V_{LINE}$) is scaled down by a resistive divider comprised of the resistor R40 (which is typically very large, for example 6 Mohm), the two transistors Q22, Q24 in their linear regions, and the programmable resistor R20 to generate the scaled down input voltage 236. The scaled down input voltage 236 is input to an analog-to-digital converter (ADC) 210 to generate a digital representation 230 of the scaled down input voltage 236, which is used by the digital controller 104 in a variety of ways to generate the pulse 102 and determine its on-times/off-times as well as set a variety of analog parameters in the power converter (e.g., internal oscillator frequency, reference voltage, etc.).

However, when the input line voltage $V_{IN}$ increases beyond a certain level, the transistor Q24 becomes saturated. When Q24 is saturated, $V_{GS}$ (gate-source voltage drop) of the transistor Q24 is typically approximately 2 V, and thus the voltage at node 234 at the source of the transistor Q24 is clamped to approximately 4 V. The 4 V clamped voltage at node 236 can be easily scaled down further by the resistive divider comprised of the programmable resistor R20 to be under 3.6 V, which is the voltage limit that can be tolerated by semiconductor devices fabricated under the low voltage CMOS process. Thus, the devices of the power converter controller IC 100 are able to receive and process a high input line voltage $V_{IN}$ even with devices fabricated using the low voltage CMOS process.

Figure 4:
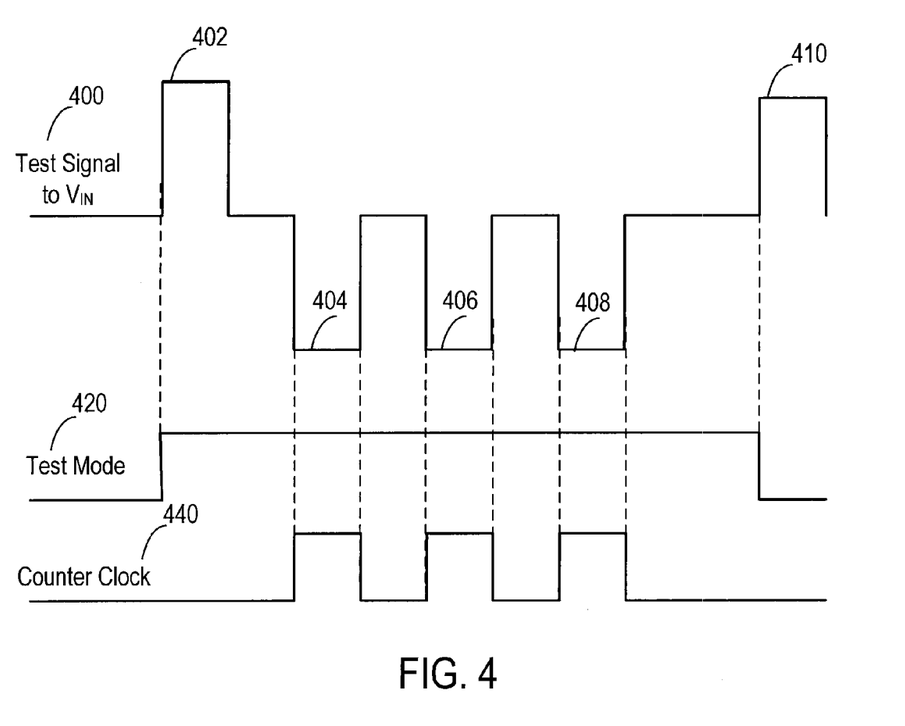
FIG. 4 illustrates the test signal used in triggering a test mode for trimming the voltage divider resistance coupled to the $V_{IN}$ pin of the power converter controller in the AC-DC flyback power converter of FIG. 1, according to one embodiment of the present invention.

FIG. 4 illustrates the test signal used in triggering a test mode for trimming the voltage divider resistance coupled to the $V_{IN}$ pin of the power converter controller in the AC-DC flyback power converter of FIG. 1, according to one embodiment of the present invention. The resistance of the programmable resistor R20 in FIG. 2 can be fixed by programming the fuses in a counter 208 associated with the programmable resistor R20. However, in order to program the programmable resistor R20, it is necessary to test the entire power converter with the power converter controller 100 to determine which programmable resistor R20 value is appropriate for the various parameters (e.g., input voltage level, type of load, etc.) of the power converter. This is achieved by injecting a test signal 400 that has a positive pulse 402, followed by negative pulses 404, 406, 408, and again followed by a positive pulse 410, into the $V_{IN}$/Startup pin of the controller IC 100. As will be explained with reference to FIG. 6, the negative pulses 404, 406, 408 are continuously generated until the appropriate value of the output voltage $V_{SENSE}$ is achieved in the power converter in its operating environment, at which time the next positive pulse 410 is generated in the test signal 400. Referring to FIGS. 2 and 4 together, in one embodiment the test signal 400 is input to the $V_{IN}$ pin and is received by the digital controller 102 to generate the test mode signal 420 and the counter clock signal 440, both of which are input to the counter 208 with fuses. The voltage level of the test signal 400 is set high enough to be detected by the digital controller 104 but low enough so as not to damage the electronic components in the power converter controller 100.

The test mode signal 420 indicates a test mode during which the values of T1-Tn for setting the programmable resistor R20 are determined. The test mode signal 420 turns high at the rising edge of the first positive pulse 402 of the test signal 400, and turns low at the rising edge of the second positive pulse 410 of the test signal 400. The test mode signal 420 can be generated, for example, as the output signal of a flip flop (not shown) that is set and reset in response to rising edges of the test signal 400. However, any logic circuitry that can generate the test mode signal 420 in accordance with the test signal 400 shown in FIG. 4 may be used.

The counter clock signal 440 indicates the number of negative pulses 404, 406, 408 in the test signal 400 while the test mode signal 400 is positive (during test mode). The counter clock signal 440 turns high at the falling edge of the negative pulses 404, 406, 408 and turns low at the rising edges of the negative pulses 404, 406, 408 of the test signal 400. The counter clock signal 440 is input to the counter 208. The counter 208 counts the number of positive pulses in the counter clock signal 440 and converts the resulting count into a programming signal T1-Tn representing the count. The programming signal T1-Tn sets the value of the programmable resistor R20, as is explained below with reference to FIG. 5. Since the negative pulses 404, 406, 408 of the test signal are generated until the appropriate value of the output voltage $V_{SENSE}$ is achieved in the power converter in its operating environment, the final count T1-Tn generated by the counter 208 represents the proper value using which the programmable resistor R20 should be set for the power converter controller 100 to appropriately scale the input voltage $V_{IN}$ to the power converter. Note that the counter 208 can also include a fuse, to permanent fix the count at the value set immediately prior to the end of the test mode 420. The counter clock signal 440 can be generated, for example, as the output signal of a flip flop (not shown) that is set and reset in response to falling and rising edges of the negative pulses 404, 406, 408 of the test signal 400. However, any logic circuitry that can generate the test mode signal 440 in accordance with the test signal 400 shown in FIG. 4 may be used.

Figure 5:
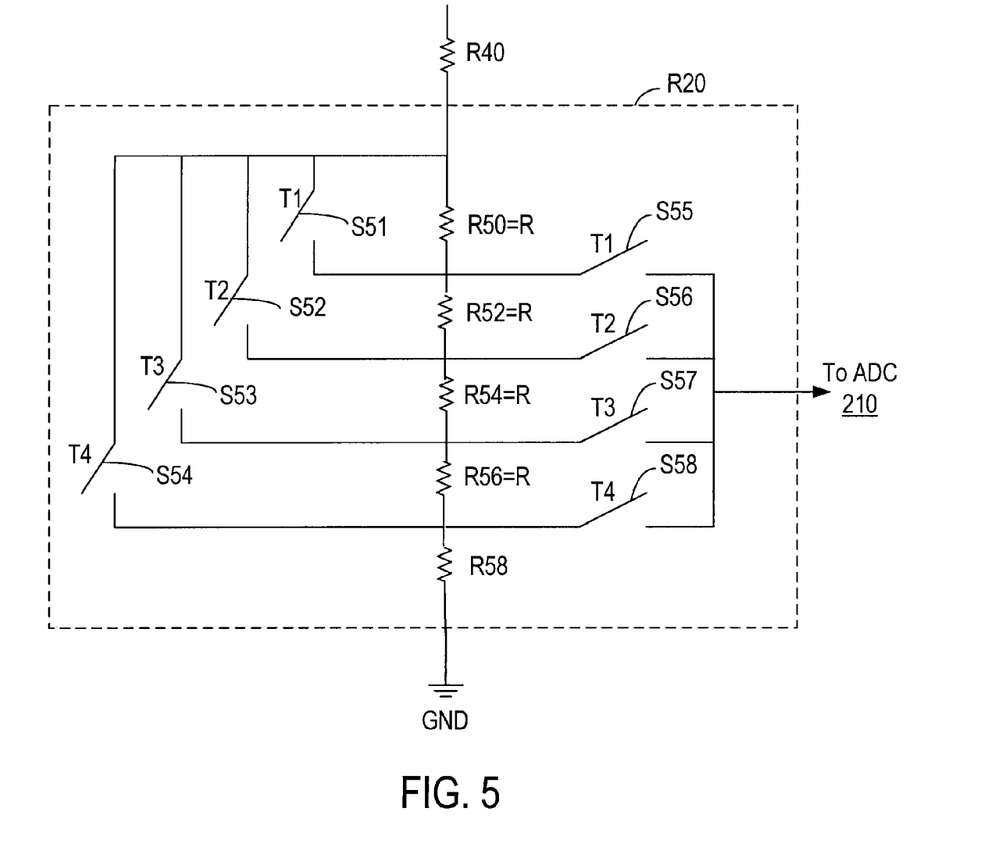
FIG. 5 illustrates the programmable resistor used in the voltage divider resistance coupled to the $V_{IN}$ pin of the power converter controller in the AC-DC flyback power converter of FIG. 1, according to one embodiment of the present invention.

FIG. 5 illustrates the programmable resistor used in the voltage divider resistance coupled to the $V_{IN}$ pin of the power converter controller in the AC-DC flyback power converter of FIG. 1, according to one embodiment of the present invention. Once the counter value T1-Tn is set by the counter 208, T1-Tn can be used to set the value of the programmable resistor R20. The example in FIG. 5 illustrates where the programmable resistor R20 is set by a 2 bit counter 208 generating 4 values (T1, T2, T3, T4), although the counter 208 may generate any number of counter values in other embodiments.

Referring to FIG. 5, programmable resistor R20 includes a plurality of resistors R50, R520, R54, R56 connected in series, an offset resistor R58, and a plurality of switches S51-S58. In one embodiment, the resistors R50, R520, R54, R56 all have the same resistance R. Switches S51 and S55 are closed when the count from the counter 208 is T1, at which time the resistor R50 is bypassed (shorted). Switches S52 and S56 are closed when the count from the counter 208 is T2, at which time the resistors R50 and R52 are bypassed (shorted). Switches S53 and S57 are closed when the count from the counter 208 is T3, at which time the resistors R50, R52, and R54 are bypassed (shorted). Switches S54 and S58 are closed when the count from the counter 208 is T4, at which time the resistors R50, R52, R54, and R56 are bypassed (shorted). The offset resistor R58 provides the minimum resistance in the programmable resistor R20. Note that the on-resistance of the switches S51-S58 is much smaller than the resistors R40, R50, R52, R54, R56, and R58, and is thus practically negligible.

Thus, for example, when the count from the counter is T1, the programmable resistor R20 is "trimmed" with a remaining trimmed resistance $R_{TRIM}$=R52+R54+R56+R58, and R50 is bypassed (shorted). When the count from the counter is T2, the programmable resistor R20 is "trimmed" with a remaining trimmed resistance $R_{TRIM}$=R54+R56+R58, and R50 and R52 are bypassed (shorted). When the count from the counter is T3, the programmable resistor R20 is "trimmed" with a remaining trimmed resistance $R_{TRIM}$=R56+R58, and R50, R52, and R54 are bypassed (shorted). When the count from the counter is T4, the programmable resistor R20 is "trimmed" with a remaining trimmed resistance $R_{TRIM}$ of R58, and R50, R52, R54, and R56 are bypassed (shorted). Thus, $R_{TRIM}$ is inversely proportional to the count (T1-T4). The voltage at node 236 input to the ADC 210 is $V_{LINE}\times R_{TRIM}$/(R40+R50+R52+R54+R56+R58). Since R40 is typically a very large resistor (e.g., 6 Mohm) and much larger than the bypassed resistor(s) in the programmable resistor R20, the voltage 236 is determined by the ratio of the $R_{TRIM}$ to the bypassed resistors in the programmable resistor R20 with sufficient accuracy.

Figure 6:
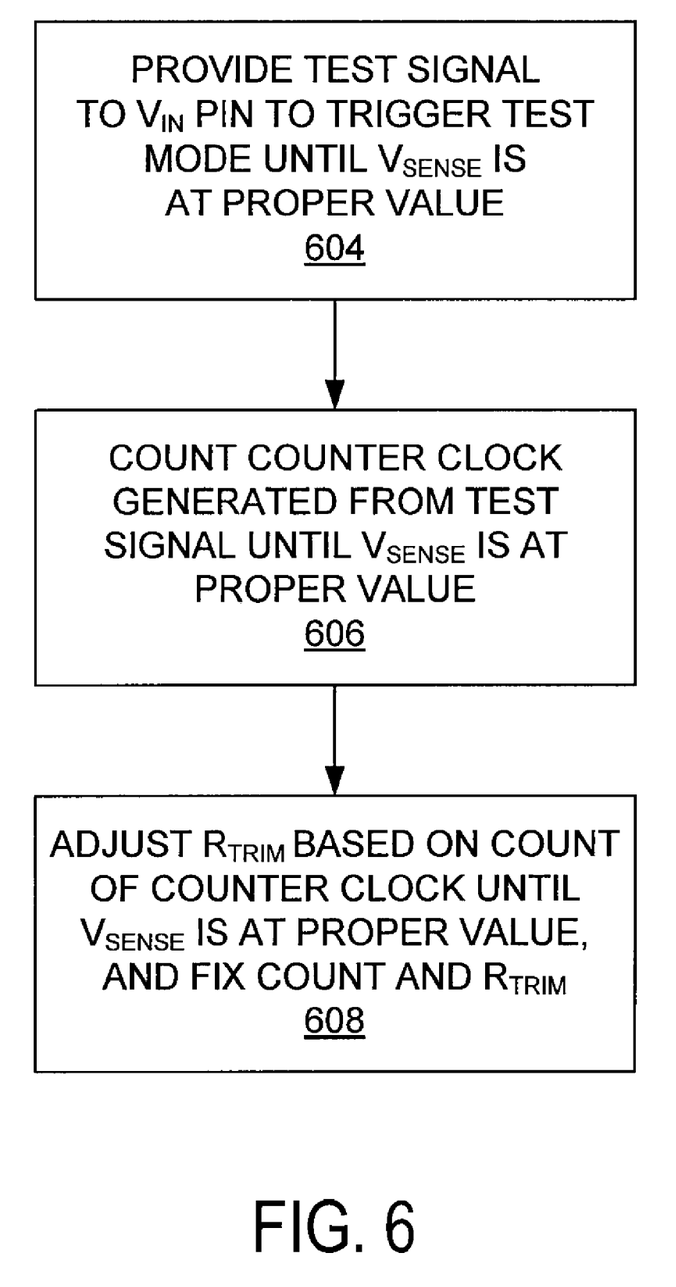
FIG. 6 is a flowchart illustrating a method of trimming the voltage divider resistance coupled to the $V_{IN}$ pin of the power converter controller in the AC-DC flyback power converter of FIG. 1, according to one embodiment of the present invention.

FIG. 6 is a flowchart illustrating a method of trimming the voltage divider resistance coupled to the $V_{IN}$ pin of the power converter controller in the AC-DC flyback power converter of FIG. 1, according to one embodiment of the present invention. As explained above, the test signal 400 as shown in FIG. 4 is provided 604 to the $V_{IN}$ pin of the controller IC 100 with the negative pulses 404, 406, 408 continuing until the proper the value of $V_{SENSE}$ is achieved. The number of pulses in the counter clock signal 400 generated based on the test signal 400 is counted 606 by the counter 208 to generate the counter value T1-Tn until the proper value of $V_{SENSE}$ is achieved. The value of the trimmed resistance $R_{TRIM}$ of the programmable resistor R20 continues to be adjusted 608 while the count 606 changes, and is fixed 608 when the proper the value of $V_{SENSE}$ is achieved, at which time the test signal 400 generates its second positive pulse 410 and the test mode signal 420 becomes inactive.

Upon reading this disclosure, those of ordinary skill in the art will appreciate still additional alternative structural and functional designs for an input voltage pin for a power converter controller IC through the disclosed principles of the present invention. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A controller integrated circuit (IC) for controlling a power converter, the controller IC comprising:
 an input voltage pin for receiving an input voltage to the power converter;
 charging circuitry internal to the controller IC for charging a capacitor coupled externally to a supply voltage pin of the controller IC; and
 scale down circuitry for scaling down the input voltage received at the input voltage pin, the scale down circuitry comprising a first transistor coupled to receive the input voltage, a second transistor connected in series to the first transistor, and a programmable resistor connected in series to the second transistor, the input voltage scaled down by the programmable resistor when both the first and second transistors are turned on.

2. The controller IC of claim 1, wherein the charging circuitry comprises a switch that is turned on and off in response to a power-on-reset (POR) signal, the POR signal being in a first state to turn on the switch when the input voltage to the power converter is below a first threshold voltage and in a second state to turn off the switch when the input voltage to the power converter rises above the first threshold voltage but does not fall below a second threshold voltage.

3. The controller IC of claim 2, wherein the capacitor is charged while the switch is turned on.

4. The controller IC of claim 1, wherein the capacitor provides supply voltage to the controller IC during a startup mode of the power converter.

5. The controller IC of claim 1, wherein the second transistor is on, and the first transistor is turned on and off in response to a power-on-reset (POR) signal, the POR signal being in a first state to turn off the first transistor when the input voltage to the power converter is below a first threshold voltage and in a second state to turn on the first transistor when the input voltage to the power converter rises above the first threshold voltage but does not fall below a second threshold voltage.

6. The controller IC of claim 1, wherein a voltage at a node between the second transistor and the programmable resistor is clamped to a predetermined voltage when the input voltage causes the second transistor to operate in saturation.

7. The controller IC of claim 1, wherein the programmable resistor comprises a plurality of resistors connected in series and a plurality of switches each coupled to one of the resistors, said each of the switches configured to short said one of the resistors to which said each of the switches is coupled, when said each of the switches is closed.

8. The controller IC of claim 7, wherein the programmable resistor is programmed by a count signal determining how many of the switches are closed and how many of the resistors of the programmable switches are shorted by said closed switches.

9. The controller IC of claim 1, wherein a test signal is input to the input voltage pin, the test signal including a first pulse with a first polarity indicating a start of a test mode, a plurality of pulses with a second polarity following the first pulse with the first polarity, and a second pulse with the first polarity indicating an end of the test mode, and wherein a count of the number of the pulses with the second polarity is used to set the programmable resistor.

10. The controller IC of claim 9, wherein the count of the number of the pulses with the second polarity in the test signal is inversely proportional to the set resistance of the programmable resistor.

11. The controller IC of claim 9, further comprising a counter for counting the number of the pulses with the second polarity in the test signal.

12. The controller IC of claim 9, further comprising a fuse for storing the count of the number of the pulse with the second polarity.

13. A controller integrated circuit (IC) for controlling a power converter, the controller IC comprising:
an input voltage pin for receiving an input voltage to the power converter; and
scale down circuitry for scaling down the input voltage received at the input voltage pin, the scale down circuitry including a first transistor coupled to receive the input voltage, a second transistor connected in series to the first transistor, and a programmable resistor connected in series to the second transistor, the input voltage scaled down by the programmable resistor when both the first and second transistors are turned on; and
wherein the second transistor is on, and the first transistor is turned on and off in response to a power-on-reset (POR) signal, the POR signal being in a first state to turn off the first transistor when the input voltage to the power converter is below a first threshold voltage and in a second state to turn on the first transistor when the input voltage to the power converter rises above the first threshold voltage but does not fall below a second threshold voltage.

14. The controller IC of claim 13, wherein a voltage at a node between the second transistor and the programmable resistor is clamped to a predetermined voltage when the input voltage causes the second transistor to operate in saturation.

15. The controller IC of claim 13, wherein the programmable resistor comprises a plurality of resistors connected in series and a plurality of switches each coupled to one of the resistors, said each of the switches configured to short said one of the resistors to which said each of the switches is coupled, when said each of the switches is closed.

16. The controller IC of claim 15, wherein the programmable resistor is programmed by a count signal determining how many of the switches are closed and how many of the resistors of the programmable switches are shorted by said closed switches.

17. The controller IC of claim 13, wherein a test signal is input to the input voltage pin, the test signal including a first pulse with a first polarity indicating a start of a test mode, a plurality of pulses with a second polarity following the first pulse with the first polarity, and a second pulse with the first polarity indicating an end of the test mode, and wherein a count of the number of the pulses with the second polarity is used to set the programmable resistor.

18. The controller IC of claim 17, wherein the count of the number of the pulses with the second polarity in the test signal is inversely proportional to the set resistance of the programmable resistor.

19. The controller IC of claim 17, further comprising a counter for counting the number of the pulses with the second polarity in the test signal.

20. The controller IC of claim 17, further comprising a fuse for storing the count of the number of the pulses with the second polarity.

21. The controller IC of claim 13, further comprising charging circuitry internal to the controller IC for charging a capacitor coupled externally to a supply voltage pin of the controller IC, the charging circuitry including a switch that is turned on and off in response to a power-on-reset (POR) signal, the POR signal being in a first state to turn on the switch when the input voltage to the power converter is below a first threshold voltage and in a second state to turn off the switch when the input voltage to the power converter rises above the first threshold voltage but does not fall below a second threshold voltage.

22. The controller IC of claim 21, wherein the capacitor is charged while the switch is turned on.

23. The controller IC of claim 21, wherein the capacitor provides supply voltage to the controller IC during a startup mode of the power converter.

24. In a controller integrated circuit (IC) for controlling a power converter, the controller IC comprising an input voltage pin for receiving an input voltage to the power converter, and scale down circuitry including a programmable resistor for scaling down the input voltage received at the input voltage pin, a method of setting a resistance of the programmable resistor, the method comprising:
providing a test signal to the input voltage pin, the test signal including a first pulse with a first polarity indicating a start of a test mode, a plurality of pulses with a second polarity following the first pulse with the first polarity, and a second pulse with the first polarity following the pulses with the second polarity and indicating an end of the test mode; and
setting the resistance of the programmable resistor based on a count of the number of pulses with the second polarity in the test signal.

25. The method of claim 24, wherein the pulses with the second polarity are continued in the test signal until a desired output voltage level is achieved in the power converter in responsive to an input voltage level, the resistance of the programmable resistor being set based on the count of the pulses with the second polarity in the test signal when the desired output voltage level is achieved.

26. The method of claim 25, wherein the count of the number of pulses with the second polarity in the test signal is inversely proportional to the set resistance of the programmable resistor.

* * * * *